United States Patent [19]

Woodbrey

[11] 4,330,587

[45] May 18, 1982

[54] METAL-THERMOPLASTIC-METAL LAMINATES

[75] Inventor: James C. Woodbrey, Chesterfield, Mo.

[73] Assignee: Monsanto Company, St. Louis, Mo.

[21] Appl. No.: 236,962

[22] Filed: Feb. 23, 1981

[51] Int. Cl.³ .................. B32B 7/02; B32B 15/08
[52] U.S. Cl. ........................ 428/215; 428/447;
428/448; 428/461; 428/457; 428/458; 428/463;
428/474.4; 428/480; 428/482; 428/522;
428/477.7; 428/475.5
[58] Field of Search ............... 428/215, 522, 458, 447,
428/448, 457, 463, 461, 474.4, 475.6, 480, 482

[56] References Cited

U.S. PATENT DOCUMENTS

| 3,382,136 | 5/1968 | Bugel et al. | 428/215 |
| 3,721,597 | 3/1973 | Colburn | 156/309 |
| 3,874,989 | 4/1975 | Stange et al. | 428/423.5 |
| 4,229,504 | 10/1980 | Brachman | 428/462 |

FOREIGN PATENT DOCUMENTS

| 1512735 | 6/1978 | United Kingdom. |
| 2038239 | 7/1980 | United Kingdom | 428/461 |

Primary Examiner—P. Ives
Attorney, Agent, or Firm—P. D. Matukaitis; E. P. Grattan; S. M. Tarter

[57] ABSTRACT

Lightweight metal-thermoplastic-metal laminates exhibiting an improved combination of good formability and bending strength comprise a core layer of a thermoplastic material selected from certain partly crystalline polyamides and polyesters, and a metal layer of certain aluminum alloys laminated on each side of the core layer, said thermoplastic and metal layers having certain requirements with respect to thickness and tensile elongation, and, additionally for the metal, tensile offset yield strength.

10 Claims, No Drawings

4,330,587

METAL-THERMOPLASTIC-METAL LAMINATES

BACKGROUND OF THE INVENTION

1. Field of the Invention

This invention relates to laminates comprising a thermoplastic core layer and metal layers (also referred to as facings) laminated on each side of the core. More particularly, this invention relates to lightweight metal-thermoplastic-metal laminates having a polyamide or polyester core and metal facings which are aluminum alloys.

2. Description of the Prior Art

Metal-thermoplastic-metal laminates and processes for their preparation have been disclosed in the prior art. See, for example, U.S. Pat. No. 3,382,136 issued May 7, 1968 to T. E. Bugel et al.

Mor recently, in U.S. patent application Ser. No. 99,918, filed Dec. 14, 1979, which was abandoned in favor of continuation application Ser. No. 230,934 filed Feb. 2, 1981, by R. M. Hedrick et al, there are disclosed metal-thermoplastic-metal laminates having a combination of properties which make the laminates particularly suitable for use as construction panels. These laminates employ as the thermoplastic core material a partly crystalline polyamide or polyester having a crystalline melting point of at least about 130° C. The metal layers laminated on each side of the thermoplastic core layer have a melting point greater than the thermoplastic core layer and a minimum thickness of about 0.00127 cm. Metals such as carbon steel, stainless steel and aluminum are disclosed. There is also disclosed a correlation between the metal layer-thickness to the thermoplastic core layer thickness. The laminates described in Hedrick et al. are lightweight and exhibit a combination of inelastic ratio, coefficient of linear thermal expansion and heat distortion temperature which make them particularly suitable for use as construction panels.

Although the teachings in Hedrick et al represent a significant advance in the art related to metal-thermoplastic metal laminates, further improvements in such laminates would be of interest. For example, laminates which combine good bending strength and good formability would be of interest to those skilled in the art. Formability of a laminate is an important property in applications where the laminate is to be formed into a shaped structure subsequent to preparation of the laminate. At the same time, it is generally desirable for a laminate to have high bending strength so that parts made therefrom maintain their shape under applied stress. Generally, improving formability of the laminate is at the expense of bending strength.

It is an object of the present invention to provide laminates with a combination of good formability and bending strength. It is a further object of this invention to provide laminates which exhibit improved dent resistance. These and other objects of the present invention will become apparent from the disclosure which follows.

SUMMARY OF THE INVENTION

In accordance with the present invention there are provided metal-thermoplastic-metal laminates comprising:

(a) a thermoplastic core layer of thickness from about 0.01 inches to about 0.09 inches, said thermoplastic being selected from the group consisting of partly crystalline polyamides and polyesters having a crystalline melting point greater than about 130° C. and a tensile elongation greater than 15 percent;

(b) a metal layer of thickness from about 0.002 inches to about 0.0085 inches laminated on each side of the thermoplastic core layer, said metal being an aluminum alloy selected from the group consisting of (i) aluminum alloys which have at least 90 weight percent aluminum, from about 0.4 to about 1.6 weight percent manganese and from 0 to about 1.3 weight percent magnesium, the weight percent of any other alloy metal being less than that of the manganese;

(ii) aluminum alloys which have at least 90 weight percent aluminum and from about 1.2 to about 5.3 weight percent magnesium, the weight percent of any other alloy metal being less than that of the magnesium;

(iii) aluminum alloys which have at least 90 weight percent aluminum, from about 0.3 to about 1.3 weight percent magnesium and from about 0.2 to about 1.5 weight percent silicon, the weight percent of any other alloy metal being less than either that of the magnesium or that of the silicon, whichever is the greater;

provided that, (A) the thermoplastic core layer thickness is less than $(0.54 - 14t_f)/d_c$ inches and greater than the value for $t_m$ required in the relationship $$(t_m+t_f)^2 + [(E_c \times 10^{-7}) - 1]t_m^3/(t_m+t_f) = 25/(S-2-000);$$

(B) the tensile offset yield strength of said metal is greater than 15,000 lbs./in.$^2$ and at least $$2000 + \frac{2600}{(t_c d_c + 14 t_f)^2} \text{ lbs./in.}^2;$$

and (C) the tensile elongation of said metal is at least
9.5 percent of said (i) aluminum alloys,
14.0 percent for said (ii) aluminum alloys,
10.0 percent for said (iii) aluminum alloys;

wherein,
$d_c$ is the density of the thermoplastic core layer in lbs./ft.$^2$-in.,
$t_c$ is the thickness of the core layer in inches,
$t_f$ is the sum of the thicknesses of the two metal layers in inches,
$t_m$ is the minimum acceptable core thickness,
$E_c$ is the Young's modulus of the thermoplastic core in lbs./in.$^2$,
S is the average tensile offset yield strength of the two metal layers in lbs./in.$^2$.

The laminates of the present invention are very lightweight (less than 0.54 lb. per sq. ft.) and exhibit an unusual combination of good formability and bending strength. These laminates also exhibit good dent resistance. The unusual combination of properties exhibited by the laminates of the present invention represents an improvement over laminates taught in the prior art.

DETAILED DESCRIPTION OF THE INVENTION

The metal-thermoplastic-metal laminates of the present invention are constructed of a thermoplastic core and two metal layers, one metal layer laminated on each side of the thermoplastic core layer. The particular requirements for the materials employed for the core and metal layers provide laminates of the present invention which exhibit a combination of properties heretofore not taught in the prior art.

The thermoplastic core layer material employed in the laminates of the present invention is selected from the group consisting of partly crystalline polyamides and polyesters having a crystalline melting point greater than about 130° C. Such materials are disclosed as core materials in the aforementioned Hedrick et al pending patent application.

The crystalline melting points of thermoplastics ($T_{mc}$) is determined by differential scanning calorimetry (DSC) using a heating rate of 10° C. per minute. The values for crystalline melting point are taken as either the temperature at which the apparent melting rate was maximum, or the temperature at which essentially the last traces of melting are detected, the latter being preferred in instances where the difference between the two is substantial, for example, greater than 10° C.

The term "partly crystalline polyamides and polyesters" is employed herein to describe polyamide- and polyester-based thermoplastic compositions, at least 40% by weight of which is organic thermoplastic polymer(s), with at least 50% by weight of the organic thermoplastic polymer(s) being polyamide or polyester polymer chains or chain segments having a degree of crystallinity (DC) greater than about 15% (this at least 50% by weight is referred to herein as the partly crystalline polyamide or polyester portion). The degree of crystallinity is specified by the following formula:

$$DC = (d_{pc} - d_{oc})/(d_{100c} - d_{oc}) \times 100$$

wherein:

$d_{pc}$ is the density of the partly crystalline polyamide or polyester portion of the thermoplastic composition at 23° C., exclusive of substantial volume fraction(s) of other non-crystallizable organic-polymer-modifier or inorganic-filler phases which the thermoplastic core composition may contain;

$d_{oc}$ is the density of the amorphous fraction (DC=0%) of the partly crystalline polyamide or polyester portion of the thermoplastic composition at 23° C.; and $d_{100c}$ is the density of the crystalline fraction (DC=100%) of the partly crystalline polyamide or polyester portion of the thermoplastic composition at 23° C.

The value of $d_{100c}$ may be calculated from the crystal type and crystal lattice parameters obtained from wide-angle X-ray diffraction measurements. The value of $d_{oc}$ may be obtained via density measurements on quenched samples exhibiting no apparent degree of crystallinity by X-ray diffraction or differential scanning calorimetric measurements. Alternatively, the value of $d_{oc}$ may be obtained by extrapolating the dependence of density of partly crystalline samples of the organic polymer with known finite values of apparent degree of crystallinity ($DC_a$) to the value of density $d_{oc}$ at which $DC_a$ is zero. Values of $DC_a$ for the partly crystalline organic polymer samples may be determined either via wide-angle X-ray diffraction, as that percent the X-radiation diffracted at wide angles by the polymer crystallites is of the total X-radiation both diffracted and scattered at wide angles by both the polymer crystallites and the amorphous portions of the polymer, or by differential scanning calorimetric measurements of the latent heat of melting, whereupon the apparent degree of crystallinity $DC_a$ is that percentage the measured heat of melting is of an estimated fixed value for the perfect polymer crystal.

In addition to the property requirements listed hereinabove, the thermoplastic core layer must also have a tensile elongation greater than 15 percent. The term "tensile elongation" of the thermoplastic means the tensile elongation at break determined at 75° C. in accordance with ASTM 638-68 using a Type I specimen at the thickness of the core in the laminate with a 2 inch gage length and a testing speed of 0.2 inches/minute. The tensile elongation of the core is as exhibited by the core after being subjected to laminating conditions.

The thermoplastic core should be essentially free of voids which tend to adversely affect the multi-axial impact resistance and formability of the laminates fabricated therefrom.

Materials which meet the above requirements of the thermoplastic core layer, as noted hereinabove, are selected from the group consisting of partly crystalline polyamides and polyesters having crystalline melting points greater than 130° C. (266° F.). Illustrative of suitable partly crystalline polyamides are various nylons, for example, nylon 6 or poly(ε-caprolactam) or poly(imino-1-oxohexamethylene), nylon 11 or poly(11-amino-undecanoic acid) or poly(imino-1-oxoundecamethylene), nylon 12 or poly(lauryl lactam) or poly(12-aminododecanoic acid) or poly(imino-1-oxododecamethylene), nylon 6,6 or poly(hexamethylene adipamide) or poly(iminoadipolyiminonexamethylene), nylon 6,9 or poly(hexamethylene azelaamide) or poly(hexamethylene nonandiamide) or poly(iminohexamethyleneiminoazelaoyl), nylon 6,10 or poly(hexamethylene sebacamide) or poly(hexamethylene decanediamide) or poly(iminohexamethyleneiminosebacoyl), nylon 6,12 or poly(hexamethylene dodecanoamide) or poly(iminohexamethyleneiminododecanedioyl), and nylon 4 or poly(ε-butyrolactam) or poly(imino-1-oxotetramethylene), nylon 7 or poly(7-aminoheptanoic acid) or poly(7-aminooenanthylic acid) or poly(imino-1-oxoheptamethylene), nylon 8 or poly(8-aminocaprylic acid) or poly(8-aminooctanoic acid) or poly(imino-1-oxooctamethylene), nylon 10,6 or poly(decamethylene adipamide) or poly(iminoadipoyliminodecamethylene) and numerous partially aromatic nylons (PARNs). PARNs result when an aromatic residue or unit is substituted in whole or in part for an aliphatic residue or unit in an aliphatic nylon polymer. For example, substitution of all of the adipic acid [HOOC—(CH$_2$)$_4$COOH] residues in nylon 6,6 by those from mixtures of about 50–70% terephthalic acid (TA, or p—HOOC—C$_6$H$_5$—COOH)/50–30% isophthalic acid (IA, or m—HOOC—C$_6$H$_5$—COOH) gives suitable PARNs which are high-melting, partly crystalline nylons 6,Ta-co-6,IA or poly(hexamethylene tere-co-isophthalamides) or poly(iminohexamethyleneiminoterephthaloyl-co-isophthaloyls). Other suitable PARNs are partly crystalline nylons 6,6-co-6,-TA, nylons 6,6-co-6,IA, nylons 6,6-co-6,TA-co-6,IA, and other similar PARNs, including partly crystalline PARNs wherein some or all of the diamine residues have aromatic character and those containing lactam residues, such as nylons 6-co-6,6-co-6,TA.

Various other types of copolyamides also are suitable. Examples are partly crystalline copolyamides of nylons 6-co-11; nylons 6-co-12; nylons 6-co-6,6; nylons 6-co-6,9; nylons 6-co-6,12; nylons 11-co-12; nylons 11-co-6,6; nylons 11-co-6,9; nylons 11-co-6,12; nylons 6-co-6,6-co-6,10; nylons 6,6-co-6,9-co-6,10; nylons 6,9-co-6,TA-co-6,IA and many other similar partly crystalline copolyamides.

Various block copolymers with partly crystalline polyamide hard blocks or chain segments also are suitable. Examples of such materials are nylon 6-block-poly(tetramethylene oxide), nylon 6-block-poly(propylene oxide), nylon 6-block-poly(ε-caprolactone), nylon 6-block-poly(butadiene), nylon 6-block-poly(dimethylsiloxane), nylon 6,6-block-poly(tetramethylene oxide), nylon 6,6-block-poly(propylene oxide), nylon 6,6-block-polybutadiene), nylon 6,6-block-poly(dimethylsiloxane), and many other similar block copolymers with partly crystalline polyamide blocks or chain segments, including those with partly crystalline copolyamide blocks or chain segments, such as (nylon 6,6-co-6)-block-poly(tetramethylene oxide), (nylons 6,TA-co-6,IA)-block-poly(tetramethylene oxide). These block copolymers with partly crystalline chain segments and soft or rubbery or elastomeric blocks or chain segments can exhibit low-notch sensitivity and high toughness and resistance to impact, even at low temperatures.

Numerous graft copolymers with partly crystalline polyamide or copolyamide blocks or chain segments also are suitable. Examples of such materials are poly(ethylene-co-propylene)-graft-nylon 6, poly(ethylene-co-propylene)-graft-nylon 6,6, poly(ethylene-co-propylene)-graft-nylon 6,9, poly(ethylene-co-propylene)-graft-(nylon 6,TA-co-6,IA), poly(butyl acrylate)-graft-nylon 6,6, poly(butyl acrylate)-graft-(nylon 6,TA-co-6,IA), polyisobutylene-graft-(nylon 6,TA-co-6,IA). As in the case of certain block copolymers, soft, rubbery or elastomeric polymers grafted with partly crystalline polyamides or copolyamides can have low notch sensitivity and high toughness and resistance to impact even at low temperatures.

Also suitable as the thermoplastic core layer in the laminates of this invention are blends or mixtures of the above partly crystalline polyamides, and polyamide and copolyamide block and graft copolymers. Examples are blends of nylon 6 with nylon 6-block-poly(tetramethylene oxide), nylon 6,6 with nylon 6-block-poly(propylene oxide), nylon 6,6 with poly(ethylene-co-propylene)-graft-nylon 6,6, nylon 6,6 with poly(butyl acrylate)-graft-nylon 6,6 and many other similar blends. Such materials also can exhibit low-notch sensitivity and high toughness and resistance to impact, even at low temperatures.

Preferred thermoplastics for the core layer of laminates of the present invention are nylon 6, nylon 6,6 and copolymers thereof.

Illustrative of suitable polyesters are partly crystalline poly(alkylene terephthalates) having alkylene groups or residues with two to about ten carbon atoms, such as poly(ethylene terephthalate), poly(butylene terephthalate) or poly(tetramethylene terephthalate), poly(decamethylene terephthalate), poly(1,4-cyclohexyldimethylol terephthalate) and many similar partly crystalline poly(alkylene terephthalates).

Partly crystalline poly(alkylene terephthalate-co-isophthalates) having alkylene groups with two to about eight carbon atoms and a terephthalate residue/isophthalate residue ratio greater than about 2.5 also are suitable. Example are partly crystalline poly(ethylene 70–100% terephthalate-co-30–0% isophthalates), poly-butylene 70–100% terephthalate-co-30-0% isophthalates), poly(1,4-cyclohexyldimethylol 70–100% terephthalate-co-30-0% isophthalates), and numerous other partly crystalline alkylene glycol-terephthalate copolyesters, such as partly crystalline poly(ethylene-co-butylene terephthalates), poly(ethylene-co-neopentylene terephthalates), poly(butylene-co-cyclohexyldimethylol terephthalates), poly(ethylene-co-cyclohexyldimethylol terephthalates), and poly(ethylene-co-cyclohexyldimethylol terephthalate-co-isophthalates).

Partly crystalline copolyesters containing some aliphatic dicarboxylic acid residues, and which have high crystalline melting points [i.e., above 130° C. (266° F.)] are also suitable. Examples are high melting, partly crystalline poly(ethylene terephthalate-co-adipates), poly(1,4-cyclohexyldimethylol terephthalate-co-adipates), and poly(butylene terephthalate-co-adipates).

Just as block copolymers with partly crystalline polyamide chain segments are suitable as the thermoplastic core layer in the laminates of the present invention, so too are block copolymers with high-melting, partly crystalline polyester or co-polyester blocks or chain segments. A few examples of such block copolymers are poly(ethylene terephthalate)-block-poly-(tetramethylene oxide), poly(butylene terephthalate)-block-poly-tetramethylene oxide), poly(butylene terephthalate-co-isophthalate)-block-poly(tetramethylene oxides), poly(ethylene terephthalate)-block-poly(ε-caprolactone), and poly(tetramethylene terephthalate-co-isophthalate)-block-poly(butadienes). These types of block copolymers also can have low-notch sensitivity and high toughness and resistance to impact, even at low temperatures.

Graft copolymers with high-melting, partly crystalline polyester or copolyester blocks or chain segments also are suitable as the thermoplastic core layer. A few examples are high-melting, partly crystalline polyisobutylene-graft-poly(ethylene terephthalate), polyisobutylene-graft-poly(butylene terephthalate), poly(ethylene-co-propylene)-graft-poly(butylene terephthalate-co-isophthalates), and poly(butadiene)-block-poly(butylene terephthalate). These types of graft copolymers also can have low notch sensitivity and high toughness and impact strength, even at low temperatures.

The thermoplastic materials can be modified with fillers, reinforcing agents, plasticizers, stabilizers, flame retardants, and other polymer modifiers, as are well-known in the art, in order to alter their properties and thereby enlarge the scope of applicability. One such modification comprises reinforcing the thermoplastic materials with mineral and/or organic fillers which may have been treated with adhesion promoters or coupling agents capable of increasing the adhesion of the fillers to the thermoplastic matrix molecules. A large number of organosilane compounds (discussed hereinbelow) have been found to be especially capable of performing the task of improving the adhesion between thermoplastics and mineral fillers and, thereby creating a synergistic effect when compared to non-treated fillers.

Preferred mineral fillers include small-particle-size quartz, wollastonite, feldspar, calcined kaolinite clay, and the like. The concentration of such mineral fillers, when employed, can vary from very small amounts, such as one or two percent by weight, up to about 35% by weight, with concentrations between about 10% and about 30% by weight being preferred.

The metal layers laminated on each side of the thermoplastic core layer are selected from (i) aluminum alloys which have at least 90 weight percent aluminum, from about 0.4 to about 1.6 weight percent manganese and from 0 to about 1.3 weight percent magnesium, the weight percent of any other alloy metal being less than that of the manganese;

(ii) aluminum alloys which have at least 90 weight percent aluminum and from about 1.2 to about 5.3 weight percent magnesium, the weight percent of any other alloy metal being less than that of the magnesium; and (iii) aluminum alloys which have at least 90 weight percent aluminum, from about 0.3 to about 1.3 weight percent magnesium and from about 0.2 to about 1.5 weight percent silicon, the weight percent of any other alloy metal being less than either that of the magnesium or that of the silicon, whichever is the greater.

In accordance with well-known aluminum industry publications on standards and data for aluminum alloys the aforementioned (i) alloys include the 3000 series alloys, the (ii) alloys include most of the 5000 series alloys and the (iii) alloys include 6000 series alloys. See, for example, *Aluminum Standards and Data,* Publication No. 1, Sixth Edition, 1979, and *Data on Aluminum Alloy Properties and Characteristics for Automotive Applications,* Publication No. T9, Third Edition, 1978, both by the Aluminum Association, Inc., 818 Connecticut Ave., N.W., Washington, D. C. 20006. Also, see E. Oberg and F. D. Jones, *Machinery's Handbook,* Seventeenth Edition, The Industrial Press, New York, N.Y., 1964, pp. 1867–1873h.

Preferred metals which can be employed in the present invention are type (i) aluminum alloys above which have from about 0.9 to about 1.6 weight percent manganese and type (ii) aluminum alloys which have from about 3.8 to about 5.3 weight percent magnesium. Such a type (i) aluminum alloy which is commercially available is 3004-aluminum alloy; such type (ii) aluminum alloys are 5056- and 5182-aluminum alloys. The preferred 3004 alloy is generally employed in tempers from approximately H11 to H19 and the 5182 and 5056 alloys can be employed in any temper. Some aluminum alloys, e.g. 0-tempers of 5182 and 5056 alloys, can be employed to prepare laminates wherein there is no substantial change in the metal yield strength and tensile elongation before and after lamination. On the other hand, certain aluminum alloys, e.g. substantially strain-hardened tempers of 3004, 5182 and 5056 alloys can be employed to prepare laminates of the present invention having suitable facings by selecting laminating conditions which alter the yield strength and the tensile elongation characteristics of the metal.

The thermoplastic core layer and the metal layer must also meet the following requirements:

(A) the thermoplastic core layer thickness is less than $(0.54 - 14t_f)/d_c$ inches and at least the value for $t_m$ required in the relationship $$(t_m + t_f)^2 + [(E_c \times 10^{-7}) - 1]t_m^3/(t_m + t_f) = 25/(S - 2{,}000);$$

(B) the tensile offset yield strength of said metal is greater than 15,000 lbs./in.² and at least $$2000 + \frac{2600}{(t_c d_c + 14t_f)^2} \text{ lbs./in.}^2;$$

and (C) the tensile elongation of said metal is at least
  9.5 percent (preferably 12 percent) for said (i) aluminum alloys,
  14.0 percent (preferably 17 percent) for said (ii) aluminum alloys,
  10.0 percent (preferably 14 percent) for said (iii) aluminum alloys;

wherein,
  $d_c$ is the density of the thermoplastic core layer in lbs/ft.²-in.,
  $t_c$ is the thickness of the core layer in inches,
  $t_f$ is the sum of the thicknesses of the two metal layers in inches,
  $t_m$ is the minimum acceptable core thickness,
  $E_c$ is the Young's modulus of the thermoplastic core in lbs./in.²,
  S is the average tensile offset yield strength of the two metal layers in lbs./in.².

The term "tensile offset yield strength" of the aluminum alloy herein tensile stress in lbs./inch² at an offset of 0.002 strain units (i.e., an offset of 0.2 percent elongation) as determined in accordance with ASTM D638-68 using a Type I specimen with a 2 inch gage length and a testing speed of 0.2 inches/minute. The term "tensile elongation" of the aluminum alloy means the tensile elongation at break, also determined in accordance with ASTM D638-68, at the same test conditions set forth above for the tensile offset yield strength. Other tensile properties herein, including core Young's modulus, were also determined in accordance with ASTM D638-68 at the same conditions. Unless otherwise stated herein, the temperature for any testing is 23° C. The yield strength and tensile elongation values are for the thickness of the aluminum alloy in the metal layer. The yield strength and tensile elongation values are both as exhibited by the metal layer after being subjected to laminating conditions. In many cases, there will be no substantial change in these properties of the metals before and after lamination. In those situations where the metal characteristics do substantially change during lamination (e.g. due to thermal conditions employed) the tensile elongation and the yield strength values can be determined after subjecting a representative sample of the starting metal material to the laminating conditions or by separation of a metal layer from a fabricated laminate by methods which are non-destructive to the integrity of the metal layer. For example, the metal layer(s) can be separated by immersing the laminate in an organic solvent which is aggressive to the thermoplastic core layer and/or the adhesive bond between the layers but is essentially non-aggressive to the metal layers.

The above requirement (C) pertaining to tensile elongation of the metal of the facings can be determined readily for a selected aluminum alloy. The requirements (A) pertaining to core layer thickness and (B) pertaining to tensile offset yield strength of the metal of the facings may vary depending upon certain of the parameters $t_f$, $t_c$, $d_c$, $E_c$ and S, said parameters defined hereinabove. The relationships set forth in requirements (B) and (C) above allow one skilled in the art to readily determine whether the requirements for the laminates within the present invention are met.

The manner in which the above defined relationships can be employed to determine the required characteristics for the laminates of the present invention can be illustrated as follows. A core material and thickness is selected complying with the requirements set forth for the core layer in (a) above. Values for $d_c$, $t_c$ and $E_c$ would thus be known. A metal is then selected for the facings in compliance with the requirements set forth in (b) above. Values for $t_f$ and S would thus be ascertainable. Compliance with the requirements (A), (B) and (C) can then be tested as follows. The tensile elongation of the metal would be ascertainable and could be checked for compliance with requirement (C). The tensile offset yield strength would then be checked to assure that requirement (B) is met. The thermoplastic core layer thickness would then be checked as regards compliance with requirement (A). If the requirements are not met the particular combination of materials are not suitable for preparing a laminate within the present invention. One skilled in the art would recognize other selections of materials which may overcome the noncompliance with any of the particular requirements (A), (B) or (C). For example, other metals could be selected if requirements (C) or (B) are not met. If requirements (B) and (C) are met but requirement (A) is not, different $t_f$ or S would be desirable. Other options to assure meeting the requirements (A), (B) and (C) would be recognized by those skilled in the art.

Preferred laminates of the present invention meet the following requirements:

(A) the thermoplastic core layer thickness is less than $(0.54 - 14t_f)/d_c$ inches and greater than the value for $t_m$ required in the relationship $$(t_m+t_f)^2 + [(E_c \times 10^{-7})-1]t_m^3/(t_m+t_f) = 25/(S-5,000);$$

(B) the tensile offset yield strength of said metal is greater than 18,000 lbs./in.$^2$ and at least $$2000 + \frac{2600}{(t_c d_c + 14 t_f)^2} \text{ lbs./in.}^2;$$

and (C) the tensile elongation of said metal is at least
 12.0 percent for said (i) aluminum alloys,
 17.0 percent for said (ii) aluminum alloys,
 14.0 percent for said (iii) aluminum alloys;
wherein $d_c$, $t_c$, $t_f$, $t_m$, $E_c$ and S are as defined above.

Although the two facings of the laminates are not required to be identical in composition or thickness they should be substantially balanced with respect to tensile offset yield strength (S) and thickness. In general there is less than 20 percent variation in thickness and in the value for S. Preferred laminates employ the same metal for both facings at essentially the same thickness.

It has been discovered that providing laminates of the particular core materials and the particular metal layers and having the particular requirements as described above, results in laminates having a unique combination of properties. These laminates possess the properties taught to be advantageous in the aforementioned Hedrick et al application, that is, good inelastic ratio, good coefficient of linear thermal expansion, good heat distortion temperature and lightweight. In addition, laminates of the present invention exhibit a combination of bending strength and formability which is exceptional for such lightweight laminates. This additional advantageous and unexpected combination of properties achieved with the present invention represents an advance over the prior art.

The laminates of the present invention are very lightweight, having weights less than about 0.54 lb. per sq. ft. For laminates of the present invention the weight in lbs/ft.$^2$ would be equal to: $t_c \times d_c + t_f \times 14$, with $t_c$, $d_c$ and $t_f$ as defined hereinbefore.

The laminates of the present invention also have high test distortion temperature (HDT$_l$), i.e., greater than about 130° C. It is particularly important in applications requiring good dimensional stability under engineering loads and wherein the laminates may be subjected to elevated temperature conditions. For example, when the laminates are employed as construction panels for automotive applications, they are subjected to elevated temperature conditions extant in paint-curing ovens—at least about 135° C. (275° F.). In such an instance, a HDT$_l$ of at least about 135° C. is necessary with about 163° C. (325° F.) being preferred in order to provide adequate dimensional stability at even higher temperatures extant in many paint-curing ovens. It will be apparent of course that the laminates must be able to withstand exposure to such elevated temperature conditions extant in paint-curing ovens without buckling, warping, flattening out (if already formed into a shaped structure), and the like.

Heat distortion temperature, also known as deflection temperature under flexural load, is measured according to a specific modification of ASTM D648-72 test method for plastics. In this modification, the sheet specimen width, b, is about 2.22 cm (0.875 inch), the length is about 7.62 cm (3 inches), the span between the supports is 5.08 cm (2 inches), and the maximum stress in the specimen is $1.82 \times 10^6$ N/m$^2$ (264 psi).

Low coefficient of linear thermal expansion in the plane of the laminate (CLTE$_l$) [less than about $63 \times 10^{-6}$ cm/cm/°C. (°C$^{-1}$) ($35 \times 10^6$°F.$^{-1}$)] is another critical property of the metal-thermoplastic-metal laminates of the present invention because in the construction applications contemplated, changes in part sizes due to temperature variations must be minimal in order to lessen the possibility of unsightly bulges and gaps between metal or concrete components and parts made with the laminates of this invention. The coefficient of linear thermal expansion is measured according to ASTM D696-70 test method for plastics. It can also be determined by measuring the distance between two finely scribed parallel lines on the surface of the specimen with a calibrated traveling microscope or cathetometer. The specimen is contained in a rectangular hole in a heavy copper block which can be thermostatically controlled at various, widely separated temperatures. The rectangular hole in the copper block is only slightly larger than the cross-section of the specimen, and the scribed lines on the surface of the specimens are visible through a narrow slit machined into the copper block.

Low inelastic ratio (IR$_l$) (good flexural elasticity) (less than about 93%) is a critical property of the metal-thermoplastic-metal laminates. The inelastic ratio characterizes the elastic recovery of such laminate panels after being subjected to deflection sufficient to produce a substantial strain (for example, 5%) in the outer metal layers at the point of maximum deflection. It is measured according to a specific modification of ASTM D790-71. The method may be described as follows:

A sheet specimen with rectangular cross-section of width b=1.27 cm (0.5 inch), a thickness or depth d in cm (inches), and a length l=L+ε, where L is the span of the flexural test in cm (inches) and ε > 1.27 cm (0.5 inch), is set horizontally into a three-point flexural test fixture (i.e., with the 1.27 cm (0.5 inch) width horizontal and the depth d vertical) and deflected vertically at a crosshead deflection rate D of 0.0212 cm/s (0.5 inch/minute) to a deflection $D_o$ in cm (inches) such that the strain r in the central portion of the outer skin of the specimen is, except where noted otherwise, 5%, as computed in percent by the formula $r = 600\, dD_o/L^2$. The span L used is approximately 16 times the depth d, except for thicknesses or depths d<0.172 cm (0.065 inches), whereupon the span used is 2.54 cm (1.00 inch). After bending the specimen to the specified deflection $D_o$, the flexural loading is immediately removed at a crosshead deflection rate of 0.846 cm/s (20 inches/minute). Then the specimen is immediately removed from the flexural test fixture, set on its edge on a flat surface and allowed to freely relax. Periodically, the specimen is placed in a fixture with the same span and configuration used in bending it, and its residual deflection $D_r$ measured with a dial gauge. When the residual deflection $D_r$ has reached its limiting, equilibrium value, $D_r = D_R$, the inelastic ratio is computed according to the formula $IR = 100\, (D_R/D_o)$, in percent. The limiting, equilibrium value $D_R$ is attained usually within a period of one to two days, but always within one week.

The good bending strength of the laminates of the present invention is demonstrated by the values obtained for the bending moment at the proportional limit determined in accordance with a specific version of ASTM D790-71. The specific version is described as follows:

A sheet specimen with a rectangular cross-section of width b=1.27 cm (0.5 inch), a thickness or depth d in cm (inches), and a length $l=(L+\epsilon)$, where L is the span of the flexural test in cm (inches) and $\epsilon > 1.27$ cm (0.5 inch), is set horizontally into a three-point flexural test fixture [i.e., with the 1.27 cm (0.5 inch) width horizontal and the depth d vertical] and deflected vertically at a cross-head rate D of 0.00212 cm/s (0.05 inch/minute). The applied load P in N (lb.) is recorded, as the deflection D in cm (inches) increases at 0.05 inches/minute. For thicknesses or depths d<0.071 inches the span L is 2.54 cm (1.00 inch). Otherwise, the span is approximately 16 times the thickness or depth of the sheet specimen. The effective flexural modulus $E_B$ in $N/m^2$ (psi) is computed from the formula $E_B = L^3 m_e/4bd^3$, where $m_e$ in N/m (lb./in.) is the experimental slope of the initial, linear portion of the load versus deflection curve. The bending moment at the proportional limit, $M_{pl}$, is computed as $M_{pl} = P_{pl} L/4b$ where $P_{pl}$ is the greatest load the material is capable of maintaining under the test conditions without any significant deviation from proportionality of load to deflection. The flexural stiffness m is computed as $m = 4bd^3 E_b/L^3$ for the specific case of b=1.00 inch (2.54 cm) and L=1.00 inch (2.54 cm).

Laminates of the present invention exhibit bending moment at the proportional limit of at least 4.5, preferably at least 5.5 determined in accordance with the above-described procedure.

The exceptional formability provided in combination with the previously discussed properties of the laminates of the present invention is shown by the high strength forming ratio, SFR, obtained in the Olsen-like Cup or Punch Deflection Test. This test involves essentially only stretch (not deep draw), wherein a sheet of laminate sample is uniformly and securely clamped between two rigid, cylindrical concentric ring die clamps and stretch formed to failure by forcing a cylindrical punch with a hemispherical nose down through the ring die clamps and laminate sample at a rate of 0.5 in./min. The upper ring die has an inside diameter of 2.022 in. and the lower ring die has an inside diameter of 2.158 in. The top inside cylindrical edge of the bottom ring die has a radius of 0.141 in. The punch is 2.000 in. in diameter and has a 2.000 in. diameter hemispherical nose with a 2-4 microinch surface finish. The apparatus and sample is kept clean, non-lubricated and thermostatically controlled at the test temperature which is 75° or 100° C. As the punch is forced down through the sample, the load versus deflection curve is recorded. Failure of the sample is taken as the first visible appearance of a fracture in the laminate or as the first abrupt change in the slope of the load versus deflection curve. Any failure which occurs near any detectable void in the plastic core or with significant delamination of the laminate layers is discarded as an invalid test result. The stretch forming ratio, SFR, is punch deflection at failure (depth of cupping at failure) in inches divided by the punch diameter in inches. The laminates of the present invention exhibit stretch forming ratios in general greater than 0.28, preferably greater than 0.30.

Laminates of the present invention additionally exhibit exceptional dent resistance. Dent resistance can be measured in accordance with the Gardner Impact Strength Test.

In the Gardner Impact Strength Test, a sheet of test specimen at least 5.08 cm by 5.08 cm (2 inches by 2 inches) in area is placed on the flat horizontal surface of a heavy steel test anvil. The specimen is centered over a vertical cylindrical hole [3.18 cm (1.25 inch) inside diameter] in the test anvil. A lightweight polished steel punch with a 1.59 cm (0.625 inch) diameter hemispherical tip is placed on the top center of the specimen. A 1.82 kg (4 lb.) hammer is dropped from a selected height onto the punch, thereby subjecting the specimen to an impact energy in N-m (in.-lb.) determined by the product of the weight of the hammer and its initial height in cm (inches). Each laminate specimen is impacted only one time, and the formation of any crack on either side of the specimen is considered a failure for the particular impact. The test usually requires a fairly large number of test specimens (usually at least 12 to 16 for each test), and the maximum height at which more than half of the specimens pass without failure is used to calculate the GIS to within ±0.226 N-m (2 in.-lb.). From these measurements, it was determined that laminates within the scope of the present invention having about 59 to 69 percent less weight per ft.² than 0.0813 cm (0.032 inch) thick automobile body steel show no failure at impact energies up to at least 80 in.-lb. at minus 25° F. Thus, the metal-thermoplastic-metal laminates also possess high energy absorption ability in that they are capable of absorbing high impact forces and, as an additional feature, any dents which occur can be hammered out without damage. The dent resistance of laminates and, for comparison purposes, of automotive body steel and aluminum sheetings, is measured as the depth in inches of the dent in the above Gardner test accompanying a 20 in.-lb. impact with the Gardner impact tester using a 0.5 lb. hammer.

The metal-thermoplastic-metal laminates of the present invention may be prepared by methods described in the prior art, for example, in the aforementioned Hedrick et al patent. The metal layers are secured to the thermoplastic core layer to form the laminates of the present invention. These laminates may employ an adhesion agent for securing the metal layers to the thermoplastic core. Although adhesion agents are preferred to insure strong metal to thermoplastic adhesion, it is not essential to employ such.

Suitable adhesion agents include adhesives and, more preferably, organo silane adhesion promoters or coupling agents.

In the laminates of the present invention, the thermoplastic core layer thickness is from about 0.01 inches to about 0.09 inches, preferably from about 0.03 inches to about 0.075 inches. The metal layers on the laminate are from about 0.002 inches to about 0.0085 inches.

A variety of methods of fabricating the laminates of the present invention may be employed including compression molding, extrusion lamination, and the like. The particular conditions of temperature, pressure and the like for the fabrication process for preparing the laminates of the present invention will vary depending on the particular materials employed. In general, elevated temperatures and pressures will be employed to assure the formation of a strong and secure metal to plastic adhesion. Typical elevated temperatures are from about 130° C. to about 350° C.

It is generally preferred that the laminating temperature be above the melting point of the core, preferred temperatures being 180° C. to about 300° C. Pressures are generally not critical with slight pressures being sufficient to bring the facings adequately in contact with the core.

Selection of particular laminating conditions for the specific materials being employed would be within the skill of the art. In some cases conditions will be selected so as not to cause any substantial change in the properties of the core and metal during lamination. In other cases particular conditions may be selected so as to alter the properties of said materials. For example, in the case of a starting facing material which has too high a degree of strain hardening and would not meet the tensile elongation requirements of the laminates of the present invention, conditions can be selected to stress relieve and increase the elongation value during lamination. Also, post-annealing after laminate fabrication can be employed to alter properties of the materials.

The following examples will illustrate the present invention in greater detail. These examples are for illustrative purposes only and are not to be construed as limiting the scope of the invention which would include various other modifications. Unless otherwise indicated herein, all parts, percentages, ratios and the like are by weight.

EXAMPLES

Laminates both within and outside the scope of the invention were prepared according to the following general procedure. For each laminate two sheets of aluminum alloy facing material slightly less than 10 inches by 10 inches square are thoroughly degreased via condensing 1, 1, 1-trichloroethane vapors. The surfaces of the sheets then are etched by immersion for about 90 seconds in aqueous alkaline cleaning solution (about 50 grams of Apex 764M Cleaner per liter of water) at about 50° C. The sheets then are thoroughly rinsed with tap water, laid on a clean flat glass plate under a flood of tap water, and one side of each sheet is rubbed with Wibril cleaning pads until the surface is clean as indicated by the removal of no additional black materials by rubbing with a clean Wibril pad. The sheets then are thoroughly rinsed with de-ionized water and hung up to air-dry. The cleaned side of each sheet then is thoroughly wetted with a stream of aqueous A-1100 $\gamma$-aminopropyltrialkoxysilane solution (from about 0.3 to about 1 ml. A-1100 silane per 100 ml. of de-ionized water), allowed to drain and air dry while hanging vertically. The treated sheets then are hung in a forced-air oven at about 130° C. for about 5 minutes. The cleaned and silane-treated side of one of the aluminum alloy sheets then is bonded to one side of the thermoplastic core material while the cleaned side of the other aluminum alloy sheet is bonded to the other side of the thermoplastic core material. The bonding is done according to the following procedure:

A TEFLON ®-coated steel mold frame, 12 inches by 12 inches square with a centered 10 inch by 10 inch square opening and a thickness slightly less than that wanted for the total laminate thickness, is selected. The mold frame is placed upon a 12 inch by 12 inch square sheet of polished aluminum foil (about 0.002–0.005 inch thick). (This foil is used as a back-up sheet to prevent hydraulic press platens from being contaminated by flashing from molten thermoplastic core material.) Then one of the aluminum alloy facing sheets is laid inside the mold frame with the cleaned, silane-treated side up. A sheet or plaque of the thermoplastic core material with a thickness and volume both somewhat above those needed for the final laminate is then placed inside the mold frame on top of the bottom facing sheet. Then the upper aluminum alloy facing sheet is placed on top of the sheet of thermoplastic core material with the silane-treated side down. The mold frame then is covered with a 12 inch by 12 inch square polished aluminum foil back-up sheet. The assembly of mold frame, laminate components and back-up sheets is placed in a hydraulic press with two 12 in. by 12 in. by about 2 in. thick rectangular parallelpiped steel platens with smooth, planar facings which are electrically preheated to a thermostatically controlled, uniform temperature (i.e. about ±4° C.) called the "lamination temperature." All of the veritcal 12 in. by 2 in. outside surfaces of the platens and the outside, horizontal back-up platen surfaces attached to the press bed and hydraulic ram are thermally insulated. The assembly is compressed at the lamination temperature for a period called "the lamination time," after which the platens and assembly are cooled to about 100° C. by forcing water through cooling cores in the platens. Then the assembly with the final laminate composition is removed from the press and allowed to air-cool to ambient temperature. Only light pressure is applied to the laminate assembly for a short period commencing immediately upon its insertion into the press platens. The length of this period depends on the initial thickness of the thermoplastic core material relative to its final thickness and upon the lamination time. It may vary from only a few seconds to as long as a few minutes. After this period, high pressure is applied to the assembly for the remainder of the time that it is in the press, even during cooling. The high pressure is derived from the application of about 10 tons or more of force onto the platens.

EXAMPLES 1-17

Compositions within the scope of this invention are exemplified by the laminates of Examples 1-17, which were prepared using the aluminum alloy facing materials of Types A through J described in Table I and the thermoplastic core materials described in Table II. The properties reported in Tables I and II are of the materials as employed in making the laminates, i.e. before lamination. As discussed previously herein the properties of the materials may change after being subjected to laminating conditions. The structures and lamination thermal conditions, i.e. the lamination time and lamination temperature, for the laminates of Examples 1-17 are described in Table III. Nominal laminate thickness represents an average thickness of the laminate which can vary in thickness in different regions by about ±5 percent. The properties of these laminates are listed in Table IV.

TABLE II
TYPES AND PROPERTIES OF THERMOPLASTIC CORE MATERIALS EMPLOYED[a]

| Type | General Description | Melting Point °C. | Young's Modulus $10^6$ lb/in.$^2$ | Density lb/ft$^2$-in. |
|---|---|---|---|---|
| N66 | 66 nylon | 263 | 0.45 | 5.96 |
| N6 | 6 nylon | 220 | 0.39 | 5.88 |
| N666/Min | Mineral-reinforced 66 nylon copolymer[b] | 246 | 0.73 | 7.23 |
| PET/HYT | Modified poly(ethylene terephthalate)[c] | 257 | 0.34 | 6.97 |

[a]Tensile elongation at break of all these materials is greater than 15% in the temperature range from 75 to 100° C.
[b]VYDYNE® R-240, nylon resin sold by Monsanto Company, which is a 32 Wt-% mineral-reinforced 66-co-6 nylon copolymer.
[c]An intimate melt blend of Goodyear VFR5041AS polyester (88 Wt-%) plus Dupont Company HYTREL® 4056, a polyester-polyether block copolymer (12 Wt %).

TABLE III
LAMINATE STRUCTURES AND LAMINATION THERMAL CONDITIONS
Examples 1-17

| Example No. | Nominal Laminate Thickness, inches | Facing[a] Type | Core[b] Type | Lamination Time, Minutes | Lamination Temp., °C. | Facing[c] Tensile Offset Yield Strength $10^3$lb/in.$^2$ | Facing[c] Tensile Elongation % |
|---|---|---|---|---|---|---|---|
| 1 | 0.072 | B | N6 | 3 | 288 | 24.7 | 11.8 |
| 2 | 0.061 | A | N66 | 3 | 277 | 25.5 | 12.3 |
| 3 | 0.059 | B | N66 | 5 | 288 | 20.0 | 12.6 |
| 4 | 0.063 | B | N66 | 4 | 283 | 24.0 | 12.6 |
| 5 | 0.062 | B | N66 | 3 | 277 | 26.6 | 10.8 |
| 6 | 0.068 | B | N66 | 4 | 270 | 28.8 | 10.1 |
| 7 | 0.061 | C | N66 | 3 | 279 | 24.1 | 12.1 |
| 8 | 0.060 | C | N66 | 2 | 271 | 27.9 | 9.6 |
| 9 | 0.064 | D | N66 | 1.6 | 282 | 23.8 | 13.0 |
| 10 | 0.062 | E | N66 | 1.1 | 282 | 28.0 | 9.9 |
| 11 | 0.063 | F | N66 | 1.1 | 282 | 28.2 | 9.9 |
| 12 | 0.059 | G | N66 | 5 | 277 | 27.5 | 17.8 |
| 13 | 0.060 | H | N66 | 6 | 277 | 23.7 | 20.3 |
| 14 | 0.060 | H | N66 | 5 | 277 | 31.1 | 14.2 |
| 15 | 0.066 | J | N66 | 0.50 | 285 | 17.1 | 10.2 |
| 16 | 0.059 | B | N666/Min | 3 | 288 | 24.7 | 11.8 |
| 17 | 0.057 | B | PET/HYT | 3 | 288 | 24.7 | 11.8 |

[a]See Table I.
[b]See Table II.
[c]After exposure to lamination conditions.

TABLE I
TYPES AND PROPERTIES OF ALUMINUM ALLOY FACING MATERIALS EMPLOYED

| Type | Thickness, in. | Alloy | Temper | Tensile Offset Yield Strength, $10^3$ lb/in.$^2$ | Tensile Elongation, % |
|---|---|---|---|---|---|
| A | 0.0046 | 3004 | H19 | 43.4 | 1.94 |
| B | 0.0062 | 3004 | H19 | 47.1 | 1.26 |
| C | 0.0080 | 3004 | H19 | 41.9 | 1.65 |
| D | 0.0062 | 3004 | H22 | 25.7 | 11.5 |
| E | 0.0062 | 3004 | H24 | 31.1 | 8.7 |
| F | 0.0062 | 3004 | H26 | 32.8 | 6.5 |
| G | 0.0051 | 5056 | H38 | 46.4 | 9.4 |
| H | 0.0060 | 5182 | H19 | 58.0 | 4.1 |
| J | 0.0060 | 6061 | T4 | 13.8 | 17.5 |
| K | 0.0050 | 1100 | 0 | 5.1 | 30.1 |
| L | 0.0060 | 6061 | 0 | 8.5 | 17.7 |
| M | 0.0064 | 6061 | T6 | 34.7 | 8.3 |
| N | 0.0052 | 5052 | H38 | 33.7 | 5.6 |
| P | 0.0080 | 5052 | H38 | 41.2 | 5.9 |
| Q | 0.0055 | 5052 | 0 | 14.1 | 19.5 |

TABLE IV
PROPERTIES OF LAMINATES
Examples 1-17

| Example No. | Nominal Weight, lb/ft$^2$ | Bending Strength, in.-lb/in.width | Stretch[a] Forming Ratio | Gardner Dent Depth, in. |
|---|---|---|---|---|
| 1 | 0.52 | 7.3 | 0.333 | 0.040 |
| 2 | 0.44 | 5.5 | 0.342 | 0.052 |
| 3 | 0.45 | 6.2 | 0.375 | 0.056 |
| 4 | 0.47 | 5.6 | 0.357 | 0.052 |
| 5 | 0.47 | 6.3 | 0.350 | 0.045 |
| 6 | 0.50 | 6.8 | 0.302 | 0.044 |
| 7 | 0.49 | 6.2 | 0.330 | 0.057 |
| 8 | 0.49 | 7.9 | 0.352 | 0.048 |
| 9 | 0.48 | 5.9 | 0.346 | 0.043 |
| 10 | 0.47 | 7.1 | 0.323 | 0.040 |
| 11 | 0.48 | 8.3 | 0.319 | 0.040 |
| 12 | 0.43 | 6.4 | 0.327 | 0.058 |
| 13 | 0.45 | 5.6 | 0.354 | 0.057 |
| 14 | 0.45 | 7.4 | 0.343 | 0.048 |
| 15 | 0.49 | 5.5 | 0.316 | |
| 16 | 0.51 | 5.9 | 0.301 | 0.047 |

TABLE IV-continued

PROPERTIES OF LAMINATES
Examples 1-17

| Example No. | Nominal Weight, lb/ft² | Bending Strength, in.-lb/in.width | Stretch[a] Forming Ratio | Gardner Dent Depth, in. |
|---|---|---|---|---|
| 17 | 0.49 | 5.0 | 0.285[b] | 0.065 |

[a] At 100° C., except where noted.
[b] At 75° C.

The interlaminar adhesion in each of the laminates of Examples 1-17 was good to excellent, as shown by no delamination during flexural, dent, stretch-forming and other tests. Generally 180° peel tests exhibit adhesion peel strengths above 25 lb./in. and typically much higher values.

Compared to typical 0.033 in. thick automotive body panel steel sheeting weighing about 1.35 lb./ft.², the laminates of Examples 1-17 are very lightweight, representing from about 62 to about 68% weight saving. The weight savings for the same laminates compared to typical 0.043 in. thick automotive body panel aluminum sheeting is from about 15 to about 29%.

The bending strength of the laminates of Examples 1-17 is very good (e.g. above 5.5 in.-lb./in. width) to excellent (e.g. above 6.5 in.-lb./in. width). Typical 0.033 in. thick automotive body panel steel sheeting has a bending strength from about 5.5 to about 7.7 in.-lb./in. width.

The formability of the laminates of Examples 1-17, as characterized by stretch forming ratio, SFR, is good (e.g. SFR above 0.280) to very good (e.g. SFR above 0.300).

The dent resistance of the laminates of Example 1-17, as measured by Gardner dent depth, GDD, also is good (e.g. GDD at or below about 0.065 in.) to excellent (e.g. GDD below 0.050 in.). Typical 0.033 in. thick automotive body steel has a GDD from about 0.046 to about 0.056 in., while typical 0.043 in. thick automotive body aluminum sheeting has a GDD from about 0.052 to about 0.062 in.

The coefficient of linear thermal expansion, CLTE, of the laminates of Examples 1-17 is in the very low range of from approximately the value of that of aluminum, about $23 \times 10^{-6}$ °C.$^{-1}$, to about $42 \times 10^{-6}$ °C.$^{-1}$.

Such low thermal expansivity is very useful in automotive body panel and similar applications.

The heat-distortion temperature, HDT, of the laminates of Examples 1-17 generally approach the melting point of the thermoplastic core material. Generally the values in these Examples are above 200° C. Such high values of HDT demonstrate laminate dimensional stability at automotive paint-oven baking temperatures (e.g. from about 150° to about 200° C.), even under engineering loads.

The inelastic ratio, IR, of from about 75 to about 88% for the laminates of Examples 1-17 is significantly better (i.e. lower) than the value of 92.5% for typical automotive body panel steel sheeting.

The flexural stiffness of the laminates of the present invention are in the very good to excellent range of from about 2650 to about 5280 lb./in. deflection/in. width compared to values from about 2600 to about 3600 lb./in./in. for typical 0.033 in. thick automotive body panel steel sheeting and about 2900 lb./in./in. for typical 0.043 in. thick autobody aluminum sheeting.

In addition the laminates of Examples 1-17 have very good to excellent low-temperature Gardner impact strength (GIS). The GIS at $-32°$ C. generally is at or above 80 in.-lb. and often above 160 in.-lb.

EXAMPLES 18-29

Comparative compositions outside the scope of this invention are exemplified by the laminates of Examples 18-29, which were prepared using the aluminum alloy facing materials of Types B, F, H and K through Q described in Table I and the thermoplastic core materials of Types N66 and PET/HYT described in Table II. The structures and lamination conditions for the laminates of Examples 18-29 are described in Table V. The properties ot these laminates are listed in Table VI.

TABLE V

COMPARATIVE LAMINATE STRUCTURES AND
LAMINATION THERMAL CONDITIONS
Examples 18-29

| Example No. | Nominal Laminate Thickness, in. | Facing[a] Type | Core[b] Type | Lamination Time, Minutes | Lamination Temp., °C. | Facing[c] Tensile Offset Yield Strength 10³lb/in.² | Facing[c] Tensile Elongation, % |
|---|---|---|---|---|---|---|---|
| 18 | 0.059 | B | N66 | 7 | 288 | 13.9 | 17.7 |
| 19 | 0.058 | K | N66 | 4 | 285 | 5.1 | 30.1 |
| 20 | 0.057 | L | N66 | 4 | 285 | 8.5 | 17.7 |
| 21 | 0.063 | B | N66 | 1.1 | 283 | 28.5 | 9.0 |
| 22 | 0.064 | F | N66 | 1.1 | 277 | 29.9 | 8.4 |
| 23 | 0.061 | H | N66 | 3 | 277 | 32.3 | 13.9 |
| 24 | 0.074 | M | N66 | 4 | 285 | 28.9 | 7.9 |
| 25 | 0.058 | M | PET/HYT | 4 | 285 | 28.9 | 7.9 |
| 26 | 0.059 | N | N66 | 7 | 296 | 14.5 | 17.6 |
| 27 | 0.060 | N | PET/HYT | 5 | 277 | 30.4 | 8.1 |
| 28 | 0.060 | P | N66 | 3 | 277 | 31.2 | 9.0 |
| 29 | 0.061 | Q | N66 | 4 | 285 | 14.1 | 19.5 |

[a] See Table I.
[b] See Table II.
[c] After exposure to lamination conditions.

TABLE VI

PROPERTIES OF COMPARATIVE LAMINATES
Examples 18-25

| Example No. | Nominal Weight, lb/ft² | Bending Strength, in.-lb/in.width | Stretch[a] Forming Ratio |
|---|---|---|---|
| 18 | 0.45 | 2.9 | 0.392 |
| 19 | 0.43 | 1.1 | — |

TABLE VI-continued
PROPERTIES OF COMPARATIVE LAMINATES
Examples 18-25

| Example No. | Nominal Weight, lb/ft² | Bending Strength, in.-lb/in.width | Stretch[a] Forming Ratio |
| --- | --- | --- | --- |
| 20 | 0.44 | 2.0 | — |
| 21 | 0.47 | 7.1 | 0.259 |
| 22 | 0.48 | 7.8 | 0.276 |
| 23 | 0.45 | 8.3 | 0.217 |
| 24 | 0.54 | — | 0.247 |
| 25 | 0.49 | 7.6 | 0.227[b] |
| 26 | 0.44 | 2.5 | — |
| 27 | 0.49 | 7.9 | 0.211[b] |
| 28 | 0.49 | 12.4 | 0.229 |
| 29 | 0.45 | 2.3 | — |

[a] At 100° C., except where noted.
[b] At 75° C.

Although these laminates are light in weight, either their bending strength is not good (i.e. below 4.5 in.-lb./in. width) or their formability is not good (i.e. stretch-forming ratio is below 0.280).

What is claimed is:

1. A metal-thermoplastic-metal laminate comprising:
   (a) a thermoplastic core layer of thickness from about 0.01 inches to about 0.09 inches, said thermoplastic being selected from the group consisting of partly crystalline polyamides and polyesters having a crystalline melting point greater than about 130° C. and a tensile elongation greater than 15 percent;
   (b) a metal layer of thickness from about 0.002 inches to about 0.0085 inches laminated on each side of the thermoplastic core layer, said metal being an aluminum alloy selected from the group consisting of
      (i) aluminum alloys which have at least 90 weight percent aluminum, from about 0.4 to about 1.6 weight percent manganese and from 0 to about 1.3 weight percent magnesium, the weight percent of any other alloy metal being less than that of the manganese;
      (ii) aluminum alloys which have at least 90 weight percent aluminum and from from about 1.2 to about 5.3 weight percent magnesium, the weight percent of any other alloy metal being less than that of the magnesium;
      (iii) aluminum alloys which have at least 90 weight percent aluminum, from about 0.3 to about 1.3 weight percent magnesium and from about 0.2 to about 1.5 weight percent silicon, the weight percent of any other alloy metal being less than either that of the magnesium or that of the silicon, whichever is the greater;
   provided that,
   (A) the thermoplastic core layer thickness is less than $(0.54 - 14t_f)/d_c$ inches and greater than the value for $t_m$ required in the relationship $$(t_m+t_f)^2 + [(E_c \times 10^{-7}) - 1] t_m^3/(t_m+t_f) = 25/(S-2000);$$

(B) the tensile offset yield strength of said metal is greater than 15,000 lbs./in.² and at least $$2000 + \frac{2600}{(t_c d_c + 14 t_f)^2} \text{ lbs./in.}^2;$$

and
   (C) the tensile elongation of said metal is at least
      9.5 percent for said (i) aluminum alloys,
      14.0 percent for said (ii) aluminum alloys,
      10.0 percent for said (iii) aluminum alloys;
   wherein,
      $d_c$ is the density of the thermoplastic core layer in lbs./ft.²-in.,
      $t_c$ is the thickness of the core layer in inches,
      $t_f$ is the sum of the thicknesses of the two metal layers in inches,
      $t_m$ is the minimum acceptable core thickness,
      $E_c$ is the Young's modulus of the thermoplastic core in lbs./in.²,
      S is the average tensile offset yield strength of the two metal layers in lbs./in.².

2. A laminate in accordance with claim 1 wherein the thermoplastic in (A) is selected from the group consisting of nylon 6, nylon 6,6 and nylon 6/nylon 6,6 copolymers.

3. A laminate in accordance with claim 1 wherein the metal in (b) is selected from said (i) aluminum alloys which have from about 0.9 to about 1.6 weight percent manganese.

4. A laminate in accordance with claim 1 wherein the metal in (b) is selected from said (ii) aluminum alloys which have from about 3.8 to about 5.3 weight percent magnesium.

5. A laminate in accordance with claim 1 wherein the thickness of the core layer (a) is from about 0.03 to about 0.075 inches.

6. A laminate in accordance with claims 1, 2, 3, 4 or 5 wherein for proviso (C) the tensile elongation of said metal is at least
   12.0 percent for said (i) aluminum alloys,
   17.0 percent for said (ii) aluminum alloys,
   14.0 percent for said (iii) aluminum alloys.

7. A laminate in accordance with claim 6 wherein provisos (A) and (B) are:
   (A) the thermoplastic core layer thickness is less than $(0.54 - 14t_f)/d_c$ inches and greater than the value for $t_m$ required in the relationship $$(t_m+t_f)^2 + [(E_c \times 10^{-7}) - 1] t_m^3/(t_m+t_f) = 25/(S-5000);$$

(B) the tensile offset yield strength of said metal is greater than 18,000 lbs./in.² and at least $$2000 + \frac{2600}{(t_c d_c + 14 t_f)^2} \text{ lbs./in.}^2$$

8. A laminate in accordance with claims 1, 2, 3, 4, or 5 wherein the laminate exhibits a bending moment at the proportional limit of at least 4.5.

9. A laminate in accordance with claim 6 wherein the laminate exhibits a bending moment at the proportional limit of at least 4.5.

10. A laminate in accordance with claim 7 wherein the laminate exhibits a bending moment at the proportional limit of at least 4.5.

* * * * *